US009133969B2

(12) United States Patent
Forni et al.

(10) Patent No.: US 9,133,969 B2
(45) Date of Patent: Sep. 15, 2015

(54) DEVICE FOR CONNECTING A ROTATABLE ELEMENT TO A STATIONARY ELEMENT

(71) Applicant: DEUBLIN ITALIANA S.R.L., Monteveglio (Bologna) (IT)

(72) Inventors: Fabio Forni, Casalecchio di Reno (IT); Andrea Toneatti, Bologna (IT)

(73) Assignee: DEUBLIN ITALIANA S.R.L., Valsamoggia (IT)

( * ) Notice: Subject to any disclaimer, the term of this patent is extended or adjusted under 35 U.S.C. 154(b) by 20 days.

(21) Appl. No.: 14/012,646

(22) Filed: Aug. 28, 2013

(65) Prior Publication Data

US 2014/0091568 A1 Apr. 3, 2014

(30) Foreign Application Priority Data

Sep. 28, 2012 (IT) .............................. MO2012A0236

(51) Int. Cl.
*F16L 17/00* (2006.01)
*F16L 27/08* (2006.01)
(52) U.S. Cl.
CPC ......... *F16L 27/0804* (2013.01); *F16L 27/0828* (2013.01)
(58) Field of Classification Search
USPC .......... 285/121.4, 272, 278, 279, 280, 98, 95, 285/9.2
See application file for complete search history.

(56) References Cited

U.S. PATENT DOCUMENTS 2,511,261 A 6/1950 Heinrich
5,651,567 A * 7/1997 Kaleniecki et al. ........ 285/121.3
6,145,846 A 11/2000 Slack et al.

FOREIGN PATENT DOCUMENTS

DE 1 936 294 U 4/1966

* cited by examiner

*Primary Examiner* — Aaron Dunwoody
(74) *Attorney, Agent, or Firm* — Pearne & Gordon LLP

(57) ABSTRACT

A device for connecting a rotatable element to a stationary element allows a flowable material to pass from the stationary element to the rotatable element, or vice versa. The device (1) comprises a stator body (2) suitable for being connected to the stationary element and a rotor body (4) suitable for being connected to the rotatable element, a conduit (5) being formed in the stator body (2) to communicate with a further conduit (6) formed in the rotor body (4). The device (1) comprises furthermore a sealing device (7) to prevent leakages of the flowable material, the sealing arrangement (7) comprising a first sealing surface (18) and a second sealing surface (19), the first sealing surface (18) being formed on a deformable sealing portion (15), so that the flowable material deforms the sealing portion (15), thereby pushing the first sealing surface (18) against the second sealing surface (19).

14 Claims, 2 Drawing Sheets

DEVICE FOR CONNECTING A ROTATABLE ELEMENT TO A STATIONARY ELEMENT

FIELD OF THE INVENTION

The invention concerns a device for connecting a rotatable element to a stationary element, permitting a flowable substance to pass through the device, so as to be conveyed from the stationary element to the rotatable element, or vice versa. Devices of this type are known with the name of "rotating joints". The device according to the invention is specifically designed to be inserted into an apparatus suitable for processing a molten polymeric material, so that this material passes through the device according to the invention.

The invention concerns furthermore the use of the above-mentioned device in an apparatus suitable for processing a polymeric material, particularly in the molten state.

DESCRIPTION OF RELATED ART

In the hydraulic or pneumatic field, rotating joints are known comprising a stator element suitable for being connected to a stationary conduit and a rotary element suitable for being connected to a rotating conduit. Between the stator element and the rotor element a system of seals is interposed having the object of preventing leakages of fluid which, through the rotating joint, passes from the stationary conduit to the rotating conduit or vice versa. The system of seals for known rotating joints comprises a main seal, free to translate with respect to the stator element, which is pushed against the rotor element. A secondary seal is also provided, comprising a ring made of elastomeric or polymeric material, interposed between the main seal and the stator element.

Rotating joints of known type operate correctly in the hydraulic or pneumatic field, i.e. when they are traversed by fluids such as oil, water or compressed air. However, rotating joints of known type are not suitable for being used in machines intended for processing highly viscous substances at high temperature, such as for example molten polymeric materials. Any leakages of molten polymeric material would in fact irremediably damage the secondary seal, which would no longer be capable of adequately performing its function, thus leading to the stoppage of the machine. Furthermore, because of contact with the molten polymeric material, the secondary seal would carbonise, also contaminating the polymeric material.

SUMMARY OF THE INVENTION

An object of the invention is to improve the known devices suitable for connecting a rotatable element to a stationary element.

A further object is to provide a device for connecting a rotatable element to a stationary element, which can be used effectively even when highly viscous materials are being processed, having a high temperature, such as molten polymeric materials.

A further object is to provide a device for connecting a rotatable element to a stationary element, which can be traversed by highly viscous materials having a high temperature, particularly molten polymeric materials, thus preventing substantial leakages of such materials.

According to the invention, a device is provided for connecting a rotatable element to a stationary element, enabling a flowable material to pass from the stationary element to the rotatable element or vice versa, the device comprising a stator body suitable for being connected to the stationary element and a rotor body suitable for being connected to the rotatable element, a conduit being formed in the stator body for communicating with a further conduit formed in the rotor body, the device further comprising a sealing arrangement for preventing leakages of the flowable material, characterised in that the sealing arrangement comprises a first sealing surface and a second sealing surface, the first sealing surface being formed on a deformable sealing portion, so that the flowable material deforms the sealing portion, thereby pushing the first sealing surface against the second sealing surface.

Thanks to the invention, it is possible to obtain a device for connecting a stationary element to a rotatable element, which can be used successfully even inside apparatuses processing a flowable material possessing a high temperature and high viscosity, for example a molten polymeric material.

When the flowable material passes through the device according to the invention, the sealing portion is in fact deformed by the pressure exerted by the flowable material circulating in the device. Consequently, the first sealing surface is pushed against the further sealing surface, preventing leakages of flowable material between the first sealing surface and the second sealing surface.

The sealing portion can be made of materials capable of easily resisting relatively high temperatures. The sealing portion can be made deformable by acting on its geometry. In this way, the sealing portion is able to be deformed in a controlled manner and according to the desired methods when it comes into contact with a flowable material with high temperature and viscosity, as occurs in the case of molten polymeric materials.

It is thus possible to avoid using sealing rings in elastomeric or polymeric material, which would be irremediably damaged in contact with molten polymeric materials, thus preventing the plant to which the device is fitted from operating correctly.

BRIEF DESCRIPTION OF THE DRAWINGS

The invention may be better understood and implemented with reference to the attached drawings, which illustrate an exemplary and non-limiting form of embodiment, in which.

DETAILED DESCRIPTION OF PREFERRED EMBODIMENTS OF THE INVENTION

Figure 1:
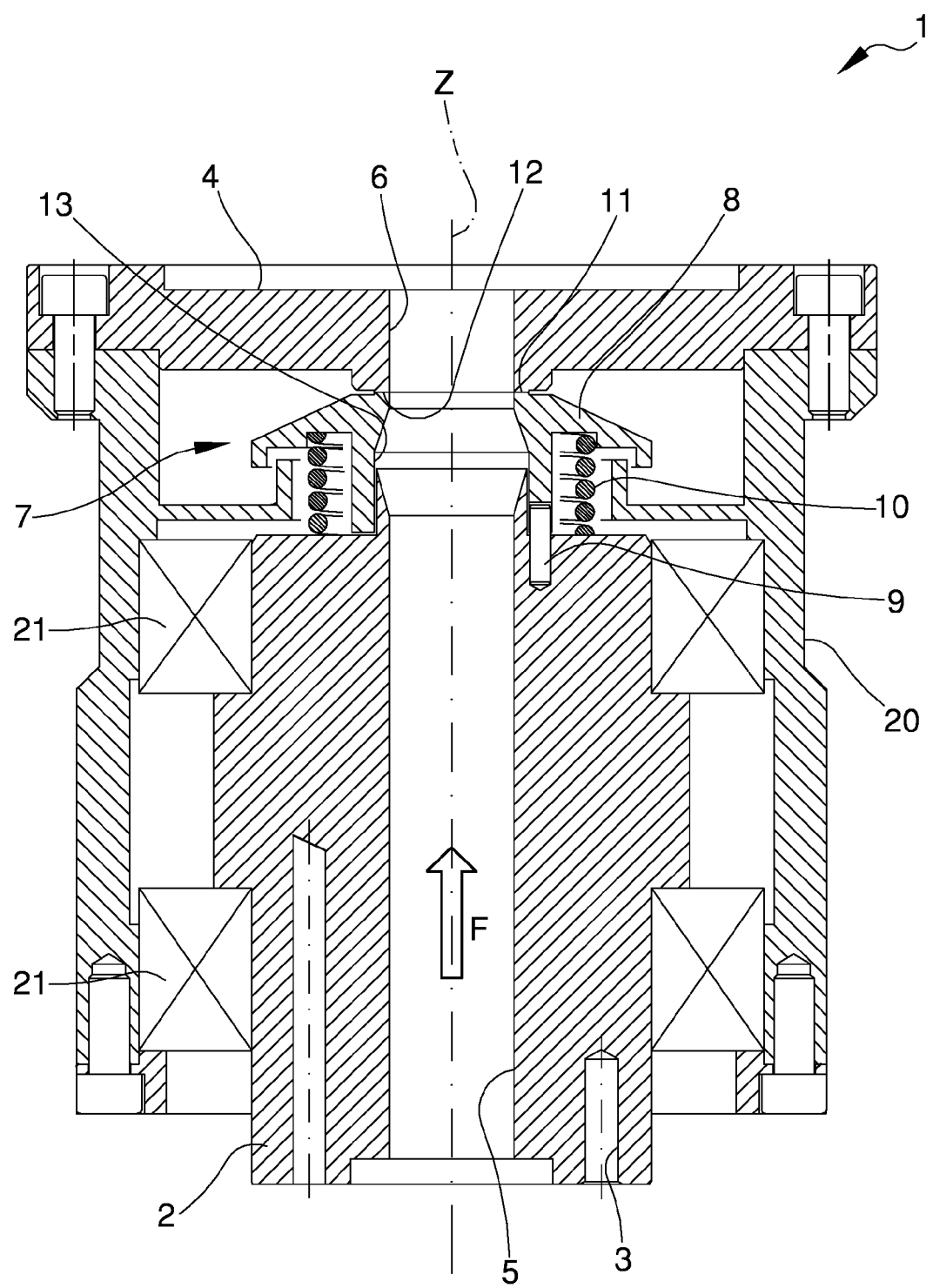
FIG. 1 is a schematic section showing a device for connecting a stationary element to a rotatable element, taken along an axis of the device.

FIG. 1 shows a device 1 suitable for connecting a stationary element (not depicted) to a rotatable element (also not depicted). The device 1 allows a flowable material to flow from the stationary element to the rotatable element or vice versa, passing through an arrangement of conduits formed in the device 1.

The device 1 comprises a stator body 2, intended to be connected to the stationary element, for example by means of a plurality of bolts suitable for engaging in corresponding threaded holes 3, one of which is visible in FIG. 1. The device 1 also comprises a rotor body 4, intended to be connected to the rotatable element by means of a fixing system (not depicted).

In use, the stator body 2 is stationary with respect to the stationary element, while the rotor body 4 rotates together with the rotatable element. Through the arrangement of conduits which puts the stator body 2 in communication with the rotor body 4, the flowable material can flow from the stator body 2 to the rotor body 4 or vice versa, even while the rotatable element rotates with respect to the stationary element.

The device 1 can therefore be considered a rotating joint, i.e. a joint which makes it possible to join a stationary element to a rotatable element, ensuring that the stationary element and the rotatable element are in fluid communication with each other.

The device 1 has a longitudinal axis Z.

A conduit 5 is formed in the stator body 2, communicating with a further conduit 6 formed in the rotor body 4. In the example depicted, the conduit 5 and the further conduit 6 are coaxial with each other and both extend along the longitudinal axis Z. It is also, however, possible to adopt other reciprocal arrangements of the conduit 5 and the further conduit 6.

The flowable material which passes through the device 1 is a molten polymeric material, for example polyethylene, polypropylene or other polymeric material with high molecular weight. In the example depicted, the device 1 has been designed for being used in an apparatus for producing objects in polymeric material, particularly by moulding. The device 1 is therefore intended to be inserted between an extruder from which the molten polymeric material exits and a moulding carousel having a plurality of moulds for forming the desired objects from molten plastic material.

In particular, the stator body 2 is designed to be connected to a stationary element positioned downstream from the extruder, so that the conduit 5 receives as intake the molten polymeric material coming from the extruder. From the conduit 5, the molten polymeric material passes into the further conduit 6 and then comes out toward the moulding carousel, which is connected, directly or indirectly, to the rotor body 4.

The molten polymeric material therefore moves inside the device 1 in the direction indicated by the arrow F.

In the example depicted, the stator body 2 has a substantially tubular conformation. The rotor body 4 can, however, be shaped substantially as a circular plate provided with a central hole which defines the further conduit 6.

Between the stator body 2 and the rotor body 4 there is provided a sealing arrangement 7, having the object of preventing the flowable material from coming out at the interface between the stator body 2 and the rotor body 4, in other words having the object of preventing leakages of flowable material between the stator body 2 and the rotor body 4. Such leakages would be particularly dangerous in the event that the material which passes through the device 1 is a molten polymeric material, because any molten polymeric material which leaked between the stator body 2 and the rotor body 4 could solidify and consequently prevent the rotor body 4 from rotating with respect to the stator body 2. This would cause the stoppage of the device 1.

The sealing arrangement 7 comprises a floating body 8 suitable for being pushed against the rotor body 4 as a result of the pressure exerted by the flowable material which passes through the device 1.

The floating body 8 is axially interposed between the stator body 2 and the rotor body 4.

The floating body 8 is free to slide axially with respect to the stator body 2. However, the floating body 8 cannot rotate with respect to the stator body 2. To this end, an anti-rotation element 9, for example a pin, is interposed between the floating body 8 and the stator body 2. The anti-rotation element 9 prevents the floating body 8 from modifying its orientation around the longitudinal axis Z with respect to the stator body 2.

The floating body 8 has a sealing face 11 arranged transversely to the longitudinal axis Z, in particular perpendicularly to the longitudinal axis Z, and suitable for coming into contact with a further sealing face 12 of the rotor body 4. When the floating body 8 is pushed against the rotor body 4, the sealing face 11 abuts against the further sealing face 12. This prevents the flowable material passing through the device 1 from leaking between the rotor body 4 and the floating body 8.

There can also be provided an elastic element 10, particularly a helical spring, for pushing the floating body 8 against the rotor body 4 with a predefined minimum force, i.e. with a predefined preload.

The floating body 8 is provided with a through hole 13 which, when the device 1 is in an assembled configuration, is arranged coaxially with the longitudinal axis Z. The through hole 13 defines a connection conduit which puts the conduit 5, formed in the stator body 2, in communication with the further conduit 6, formed in the rotor body 4.

Figure 2:
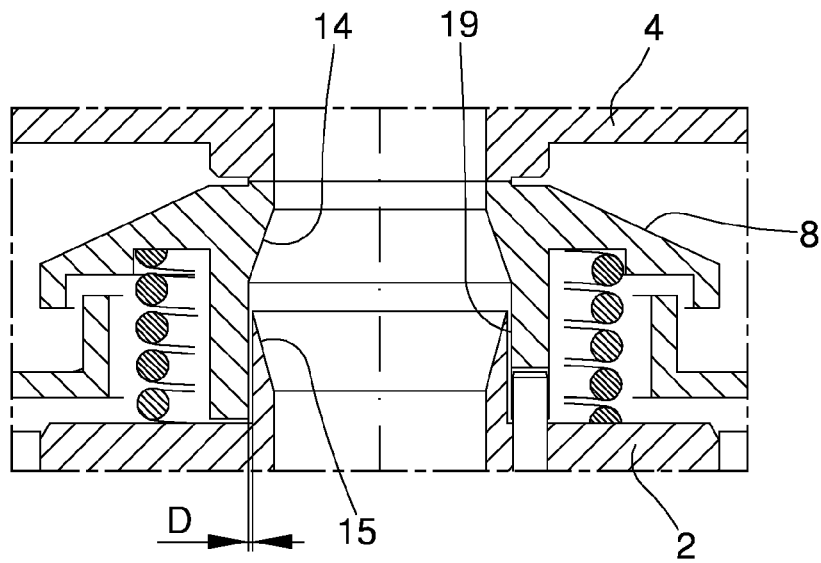
FIG. 2 is an enlarged section, showing a sealing arrangement of the device of FIG. 1, in a rest configuration.

The through hole 13 has a narrowing of its cross section 14, shown in FIG. 2, such that the cross section of the through hole 13 is reduced while passing from the stator body 2 towards the rotor body 4. The narrowing of cross section 14 can be defined, for example, by a taper portion of the through hole 13, the taper portion being interposed between two cylindrical portions. Thanks to the narrowing of cross section 14, the flowable material passing through the device 1, and in particular through the through hole 13, exerts on the floating body 8 a direct axial force from the stator element 2 towards the rotor body 4. This makes it possible to keep the floating body in contact with the rotor body 4 even when the rotor body 4 rotates with respect to the stator body 2 and therefore to the floating body 8.

The sealing arrangement 7 comprises a sealing portion 15 suitable for preventing leakages of flowable material between the stator body 2 and the floating body 8.

Figure 3:
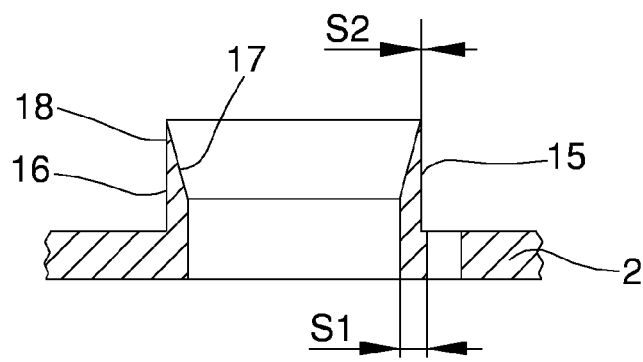
FIG. 3 is a section showing a detail of FIG. 2.

In the example depicted, the sealing portion 15 is formed on the stator body 2, particularly at an end of the stator body inserted into the floating body 8. The sealing portion 15 comprises a deformable zone of the stator body 2, whose geometry can be modified as a result of the pressure exerted inside the stator body 2 by the flowable material passing through the device 1. In particular, as shown in FIG. 3, the deformable zone of the stator body 2 which defines the sealing portion 15 can be an annular zone in which the stator body 2 has a lateral wall whose thickness diminishes, for example linearly, from an initial value S1, of the order of several millimetres, to a final value S2, of the order of several tenths or indeed hundredths of a millimetre. More generally, the final thickness S2 can be the least thickness practically obtainable, compatible with the limits of strength of the material which constitutes the stator body 2.

In the example depicted, the sealing portion 15 of the stator body 2 is delimited by a substantially cylindrical outer surface 16 and by a conical inner surface 17. The latter makes it possible to reduce the thickness of the sealing surface 15 from the initial value S1 to the final value S2.

In the sealing portion 15 it is possible to identify a first sealing surface 18, which extends around the longitudinal axis Z in proximity to the end of the stator body 2 which is inserted into the floating body 8.

The first sealing surface 18 is suitable for interacting with a second sealing surface 19, formed in the through hole 13 of the floating body 8. The second sealing surface 19 extends around the longitudinal axis Z.

Figure 4:
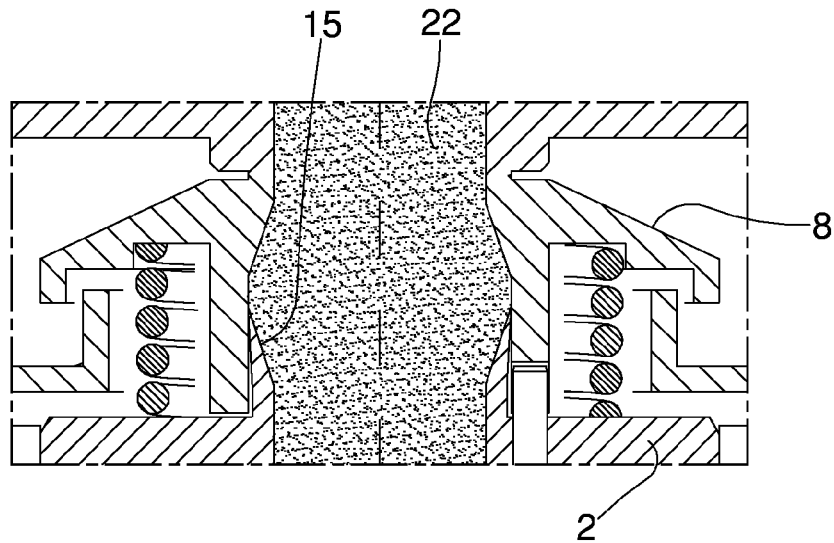
FIG. 4 is a section like that of FIG. 2, showing the sealing arrangement in a working configuration.

In an undeformed configuration, i.e. when the device 1 is not working, between the first sealing surface 18 and the second sealing surface 19 there is defined a radial clearance D, shown in FIG. 2. When the flowable material, indicated by the number 22 in FIG. 4, flows into the device 1, the flowable material, as a result of its pressure, deforms the sealing portion 15, in particular in proximity to the final thickness S2. Consequently, the diameter—both internal and external—of the sealing portion 15 in proximity to its free end increases, as shown in FIG. 4, and the first sealing surface 18 comes into contact with the second sealing surface 19. Radial leakages of the flowable material between the stator body 2 and the floating body 8 are thus prevented.

The device 1 comprises furthermore a housing element 20, shown in FIG. 1, fixed to the rotor body 4 so as to rotate integrally with the rotor body 4. The housing element 20, which may have a substantially tubular conformation, surrounds the stator body 2. Between the stator body 2 and the housing element 20 there are interposed one or more support elements 21, for example roller bearings or plain bearings, which allow the housing element 20 to be rotatably supported around the stator body 2. The stator body 2, the rotor body 4 and the floating body 8 are made of materials resistant to relatively high temperatures, in particular to the temperatures of molten polymeric materials. In particular, the stator body 2, the rotor body 4 and the floating body 8 can be made of metallic, particularly ferrous, materials.

In use, the stator body 2 is fixed to the stationary element connected to the extruder, while the rotor body 4 is fixed to the rotatable element connected to the moulding carousel.

The device 1 is maintained in conditions of controlled temperature by a thermo-regulation device (not depicted).

The molten polymeric material coming from the extruder flows through the device 1 at a pressure of the order of 200 bar and at a temperature comprised between 150° C. and 200° C.

In particular, the molten polymeric material passes along the conduit 5 formed in the stator body 2, then through the through hole 13 formed in the floating body and it finally exits from the device 1 through the further conduit 6 formed in the rotor body 4.

When the molten polymeric material flows through the floating body 8, the latter, already pushed against the rotor body 4 by the elastic element 10, is further pressed against the rotor body 4. This is due to the axial force, directed in the direction of the arrow F, which the molten polymeric material exerts on the floating body 8, both because of the conformation of the narrowing of section 14, and because of the dragging friction which develops between the molten polymeric material and the internal surface of the through hole 13.

While the floating body 8 is pushed against the rotor body 4, the anti-rotation element 9 keeps the floating body 8 axially guided with respect to the stator body 2, preventing the floating body 8 from rotating with respect to the stator body 2. The rotor body 4, however, rotates in contact with the floating body 8.

The sealing face 11 of the floating body 8 is pushed, as explained above, against the further sealing face 12 of the rotor body 4. Leakages of molten polymeric material between the floating body 8 and the rotor body 4 are thus prevented. A frontal seal is therefore defined between the floating body 8 and the rotor body 4.

Simultaneously, the molten polymeric material deforms the sealing portion 15 of the stator body 2, so as to radially enlarge the sealing portion 15. The first sealing surface 18 of the sealing portion 15 is thus pushed against the second sealing surface 19 of the floating body 8. Leakages of the molten polymeric material are thus prevented between the stator body 2 and the floating body 8. The sealing portion 15 therefore acts as a radial seal.

Thanks to the sealing arrangement 7, the molten polymeric material can pass through the device 1, thus passing from the stationary element to the rotatable element, without undergoing significant leakages which could compromise the correct operation of the device 1. The components of the device 1 which come into contact with the molten polymeric material can be made with materials resistant to high temperatures, particularly metallic materials, so as not to be damaged by the molten polymeric material. The use is furthermore avoided of sealing rings in elastomeric or polymeric material, which, in devices according to the state of the art, created numerous disadvantages because of the high temperatures of the molten polymeric material.

Although, in the preceding description, extensive reference has been made to molten polymeric material, it is understood that the device 1 can also be used to process other types of flowable or fluid material, particularly at high temperature.

Furthermore, the sealing portion 15 which, by being deformed because of the pressure exerted by the flowable material, creates a seal between the stator body 2 and the floating body 8, could also have a different geometry from the geometry shown in the drawings.

Again, the sealing portion 15 could be formed on the floating body 8, instead of on the stator body 2.

Finally, in a simplified version not depicted, the floating body 8 could be omitted, and the sealing portion 15 could ensure the seal directly between the stator body 2 and the rotor body 4.

The invention claimed is:

1. A device for connecting a rotatable element to a stationary element, enabling a flowable material to pass from the stationary element to the rotatable element or vice versa, the device comprising a stator body suitable for being connected to the stationary element and a rotor body suitable for being connected to the rotatable element, a conduit being obtained in the stator body so as to communicate with a further conduit obtained in the rotor body, the device further comprising a sealing arrangement for preventing leakage of the flowable material, wherein the sealing arrangement comprises a first sealing surface and a second sealing surface, the first sealing surface being obtained on a deformable sealing portion, so that the flowable material deforms the sealing portion, thereby pushing the first sealing surface against the second sealing surface, the sealing arrangement comprising a floating body suitable for being pushed by the flowable material against a component selected from amongst the stator body and the rotor body.

2. The device according to claim 1, wherein the sealing portion is radially deformable, so as to ensure a radial seal between the first sealing surface and the second sealing surface.

3. The device according to claim 1, wherein the sealing portion has an annular conformation and is defined by a lateral wall having a thickness that decreases from an initial value to a final value, so as to render the sealing portion deformable.

4. The device according to claim 1, wherein the sealing portion is delimited by a first cylindrical surface, and by a second conical surface.

5. The device according to claim 1, wherein the first sealing surface and the second sealing surface are cylindrical surfaces that are coaxial to one another, the first sealing surface being arranged inside the second sealing surface.

6. The device according to claim 1, wherein, in a rest configuration in which the flowable material is not present in the device, a radial clearance is defined between the first sealing surface and the second sealing surface.

7. The device according to claim 1, wherein, the second sealing surface is obtained on the floating body.

8. The device according to claim 1, wherein the floating body is interposed between the stator body and the rotor body and it is provided with a through-hole.

9. The device according to claim 8, wherein the through-hole has a narrowing of its cross-section, said narrowing being so positioned that the pressure exerted by the flowable material on said narrowing of cross section pushes the floating body against said component.

10. The device according to claim 1, wherein the floating body has a sealing face suitable for abutting against a further sealing face of said component, so as to ensure a front seal between the floating body and said component.

11. The device according to claim 1, and further comprising an anti-rotation element for enabling the floating body to slide without rotating with respect to the other component selected from amongst the rotor body and the stator body.

12. The device according to claim 1, wherein the sealing portion is obtained at one end of the stator body, said end being arranged inside the floating body.

13. The device according to claim 4, wherein the first cylindrical surface is an external surface of the sealing portion and the second conical surface is an internal surface of the sealing portion.

14. The device according to claim 8, wherein the through-hole of the floating body is coaxial with said conduit and said further conduit.

* * * * *